(12) United States Patent
Stevenson et al.

(10) Patent No.: US 11,439,125 B2
(45) Date of Patent: Sep. 13, 2022

(54) RECONFIGURABLE PET TOY

(71) Applicant: Eddie's LLC, Aliquippa, PA (US)

(72) Inventors: Joseph Edward Stevenson, Aliquippa, PA (US); Matthew K Stevenson, Aliquippa, PA (US)

(73) Assignee: EDDIE'S, LLC, Aliquippa, PA (US)

(*) Notice: Subject to any disclaimer, the term of this patent is extended or adjusted under 35 U.S.C. 154(b) by 0 days.

(21) Appl. No.: 17/328,378

(22) Filed: May 24, 2021

(65) Prior Publication Data
US 2022/0061268 A1 Mar. 3, 2022

Related U.S. Application Data

(60) Provisional application No. 63/070,616, filed on Aug. 26, 2020.

(51) Int. Cl.
A01K 15/02 (2006.01)
A01K 5/01 (2006.01)

(52) U.S. Cl.
CPC .......... *A01K 15/025* (2013.01); *A01K 5/0114* (2013.01)

(58) Field of Classification Search
CPC .. A01K 15/025; A01K 5/0114; A01K 15/026; F16L 41/02; F16L 41/021; F16L 41/023
USPC ............. 285/12, 125.1–133.11, 901; 446/89; 434/126
See application file for complete search history.

(56) References Cited

U.S. PATENT DOCUMENTS

| | | |
|---|---|---|
| 5,865,147 A | 2/1999 | Rubin |
| D406,924 S | 3/1999 | Kolozsvari |
| 6,158,391 A | 12/2000 | Simonetti |
| 6,186,096 B1 | 2/2001 | Miller |
| 6,941,895 B2 * | 9/2005 | St. Pierre ............. A01K 5/0114 119/51.01 |
| 7,536,978 B2 | 5/2009 | Washington et al. |
| 7,600,488 B2 | 10/2009 | Mann |
| 7,631,613 B2 | 12/2009 | Lescroart |
| 8,141,521 B2 * | 3/2012 | Shatoff ................ A01K 15/025 119/707 |
| D665,136 S | 8/2012 | Day |

(Continued)

FOREIGN PATENT DOCUMENTS

| | | |
|---|---|---|
| DE | 202015003254 U1 | 6/2015 |
| KR | 30-10500100 S | 3/2020 |
| KR | 30-10500200 S | 3/2020 |

*Primary Examiner* — Trinh T Nguyen
(74) *Attorney, Agent, or Firm* — Dentons Cohen & Grigsby P.C.

(57) ABSTRACT

Disclosed is an animal toy including a plurality of body portions each having an axial bore and axial ends. The plurality of body portions are connectable to each other about their axial ends to form a continuous channel configured to accommodate a solid food item. One or more caps may be sealed about the axial ends, wherein at least one axial end includes an exit opening configured to accept or dispense the solid food item. Also disclosed is a kit that includes a plurality of these components so that a user may attach the various components to provide a first configuration and may later reconfigure the various components to provide a second or third, etc., configuration. In this way, the user may change a location of the exit opening for the solid food item, extend the size of the toy, and/or change the shape of the toy.

19 Claims, 12 Drawing Sheets

(56) References Cited

U.S. PATENT DOCUMENTS

| | | | |
|---|---|---|---|
| 8,235,005 B2 * | 8/2012 | Schmidt | A01K 5/0114 |
| | | | 119/51.01 |
| D812,820 S | 3/2018 | Bolter et al. | |
| 10,524,453 B2 | 1/2020 | Stone | |
| 2009/0208271 A1 * | 8/2009 | Krohn | F16L 41/021 |
| | | | 403/4 |
| 2013/0139756 A1 | 6/2013 | Miebach | |
| 2014/0360434 A1 * | 12/2014 | Yacov | A01K 5/0114 |
| | | | 119/51.5 |
| 2016/0316719 A1 | 11/2016 | Parness | |
| 2019/0133082 A1 | 5/2019 | Becattini et al. | |

* cited by examiner

90 DEGREE ELBOWS

45 DEGREE ELBOWS

TEES

CROSSES

UNIONS

LATERALS

PIPE CAPS

COUPLINGS

RECONFIGURABLE PET TOY

CROSS REFERENCE TO RELATED APPLICATIONS

This application claims priority to U.S. Provisional Patent Application No. 63/070,616 filed Aug. 26, 2020, the entire content of which is incorporated herein by reference.

FIELD

The present disclosure pertains generally to pet toys, and in particular to a pet toy constructed with a combination of connectable parts that form a central channel configured to contain a solid food item and having at least one opening providing exit for the solid food item.

BACKGROUND

In nature, animals such as dogs must scavenge or hunt for their food. These activities take up a lot of their time and involve physical exertion such as roaming large areas; chasing and digging; problem-solving; use of their senses of hearing, taste and smell; and social coordination. Providing food in a simple bowl for a pet dog goes against their fundamental nature by removing a major source of stimulation in their lives.

The need to provide stimulation or entertainment for pets is well known in the art. As such, there are a great number of pet toys on the market, and especially a great number of dog toys. For example, U.S. Pat. Nos. 5,865,147, 6,158,391, 6,186,096, 7,536,978, 7,600,488, 7,631,613, and 10,524,453; U.S. Pat. Application Pub. Nos. 2013/0139756, 2016/0316719, and 2019/0133082; and German Pat. Application Pub. No. DE2020/15003254, all disclose animal toys that dispense treats. U.S. Design Pat. Nos. D665136 and D812820, and Korean Design Pat. Nos. KR301050010 and KR301050020 also disclose pet toys that dispense food or treats. Many of these toys provide a simple inner chamber that holds the treats with one or more exit openings positioned along a radial perimeter of the chamber, such that rolling the toy causes the treats to fall out of the toy.

Such toys may entertain the pet and prevent negative behavior by the pet, such as chewing or damaging an item in the pet's household. Each of the toys, however, comprise a specific preset configuration that is unchangeable. Moreover, due to the preset configuration, a location for dispensing the treat or food item is also preset. Thus, once the animal becomes accustomed to the toy, they may lose interest.

U.S. Pat. No. 6,941,895 discloses a toy that provides some options for changing a configuration of the toy. However, the location of the opening that dispenses the treats remains the same with every configuration, and the opening size for dispensing the treat is preset, such that the toy is best configured to accept and/or dispense only a specific size range of treats.

Accordingly, there remains a need in the field for a durable pet toy that may provide a wide variety of configurations and accommodate a range of treat sizes, and thus may enhance the pet's interaction with the toy.

SUMMARY

The present disclosure provides pet toys comprising a hollow channel configured to accommodate a solid food item and at least one opening configured to allow entry or exit of the solid food item. The toy may be arranged in a wide variety of configurations that may change the shape and/or dimensions of the toy, as well as the location and/or size of the opening for dispensing the solid food item, thus increasing the stimulation aspects of the toy such as by making it more difficult for the animal interacting with the toy to access the food item contained therein.

According to its major aspects, and briefly stated, the present disclosure relates to an animal toy comprising a plurality of components formed of a durable material and at least one cap configured to seal about the open axial ends. Each component comprises an axial bore therethrough and at least two open axial ends, wherein the plurality of components are connectable to each other about their open axial ends to form a continuous channel configured to accommodate a solid food item therein. At least one open axial end provides an opening configured to accept or dispense the solid food item from the animal toy, wherein the opening is not positioned radially along the axial bores of the plurality of body portions but at an axial end thereof.

The animal toy may comprise at least two components, such as at least three or more components, individually selected from the group consisting of an elongated body portion, a tee, a reducing tee, an elbow, a wye, a cross, a reducing cross, a union, a coupler, a reducer, a lateral, and a reducing lateral.

The opening configured to accept or dispense the solid food item may be through an open axial end that remains uncapped or through an open axial end of a component having a reduced diameter region or section. Additionally, or alternatively, the opening may comprise an cap sealed thereon, wherein the cap comprises at least one hole configured to accept or dispense the solid food item therethrough.

The present disclosure further relates to a kit for a reconfigurable animal toy. The kit may comprise at least one elongated body portion formed of a durable material and having an axial bore therethrough and at least two open axial ends; a plurality of end portions each formed of the durable material and having an axial bore therethrough and at least two open axial ends; and at least one cap configured to releasably seal about the open axial ends. The at least one elongated body portion, the plurality of end portions, and the at least one cap may be releasably connected to provide a central channel configured to accommodate a solid food item therein and at least one opening configured to accept or dispense the solid food item, wherein the opening is not positioned radially along the axial bores of the at least one elongated body portion or the plurality of end portions but at an axial end thereof.

The plurality of end portions may be individually selected from the group consisting of a tee, a reducing tee, an elbow, a wye, a cross, a reducing cross, a union, a coupler, a reducer, a lateral, and a reducing lateral.

The durable materials of the toys and/or kits disclosed herein may comprise a polymer having a yield strength configured to withstand an animal bite strength of at least 100 psi and up to 800 psi. The polymer may have a shore D hardness of at least 60 or a Rockwell hardness of at least 50. The polymer may have a shore D hardness of at least 70 or a Rockwell hardness of at least 60. Exemplary polymers include at least polyvinyl chloride (PVC), high density polyethylene (HDPE), polypropylene (PP), polylactic acid (PLA) polymers, polyethylene terephthalate (PETE), or a combination thereof.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present disclosure, unless stated to be otherwise, are not necessarily drawn to scale.

DETAILED DESCRIPTION

Figure 1:
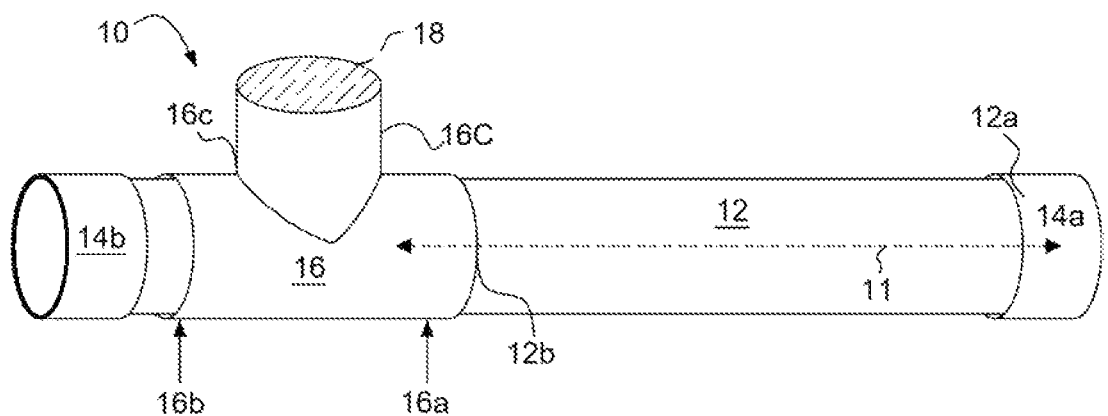
FIGS. 1-13 illustrate schematic diagrams of various designs for reconfiguration pet toys according to aspects of the present disclosure.

In the following description, various alternative embodiments and implementations of a durable pet toy having a hollow interior configured to accommodate a food item, which may be accessed by the pet through one or more axial openings, are disclosed. According to certain aspects, the pet toy may be provided as separate portions that may be releasably attached to each other to afford at least one of a variety of unique configurations, i.e., the pet toy may be reconfigurable. According to certain aspects, the pet toy may be provided as separate portions that may be non-releasably attached to each other to afford a unique user defined configuration or may be provided in a specific predetermined configuration. In either of these latter aspects, a location of the entry/exit opening for the solid food item may be changeable, such as by changing a sealing configuration of the axial openings.

Various aspects of the pet toy may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the pet toy may be illustrated with reference to one or more exemplary implementations or embodiments. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the pet toy in addition to the orientation depicted in the drawings. By way of example, if aspects of the pet toy shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to a "connector" is a reference to one or more connectors and equivalents thereof known to those skilled in the art, and so forth. Unless defined otherwise, all technical and scientific terms used herein have the same meanings as commonly understood by one of ordinary skill in the art.

The presently disclosed animal or pet toy is formed of a durable material and includes at least one internal channel configured to accommodate a solid food item, such as a treat. The toy generally comprises at least one opening that may provide exit of the food item when the toy is agitated, such as when a pet plays with the toy.

The design of the toy to include possible incorporation of a food item provides additional stimulation for the pet and may extend the amount of time the pet enjoys interacting with the toy. Additionally, according to certain aspects, the toy may be reconfigured to provide a wide variety of shapes and arrangements that may change a position of the exit for the food item, the difficulty for retrieval of the food item, and/or may enable several pets to interact with the toy at one time. Such reconfiguration may provide further stimulation for the pet, such as when they become accustomed to a first configuration or food item exit location.

Referring now to the drawings, various aspects of the pet toy of the present disclosure are shown in FIGS. 1-13. In FIGS. 1-8, similar elements of the pet toy may be numbered in a similar manner in the various figures. For example, a first body portion is numbered as 12 in FIG. 1, as 22 in FIG. 2, as 32 in FIG. 3, etc.; and a first end portion is numbered as 16 in FIG. 1, as 26 in FIG. 2, as 36 in FIG. 3, etc. Likewise, each component may have a first end labeled with a lowercase "a" and a second end labeled with a lower case "b", such as a first end 12a of the first body portion 12 or a second end 16b of a first end portion 16, etc.

FIG. 1 illustrates a schematic view of an exemplary reconfigurable animal or pet toy 10 comprising an elongated first body portion 12 having a central longitudinal axis 11 and first and second ends (12a and 12b, respectively). The elongated first body portion 12 generally has an axial bore or channel parallel with the central longitudinal axis 11, and open axial ends such as, for example, a hollow cylinder. It should be noted that while each of the body portions, end portions, and caps are shown to have a generally cylindrical shape, other polygonal shapes and configurations are possible and within the scope of the present disclosure, such as octagonal, hexagonal, pentagonal, square, triangular, oval, ellipsoid, etc.

The elongated or first body portion 12 may have a closed first end 12a and an open second end 12b. As shown in FIG. 1, the closed first end 12a may be closed by means of a cap 14a or other closure. The open second end 12b allows access to the central channel, which is configured to accommodate a solid food item.

Figure 14:
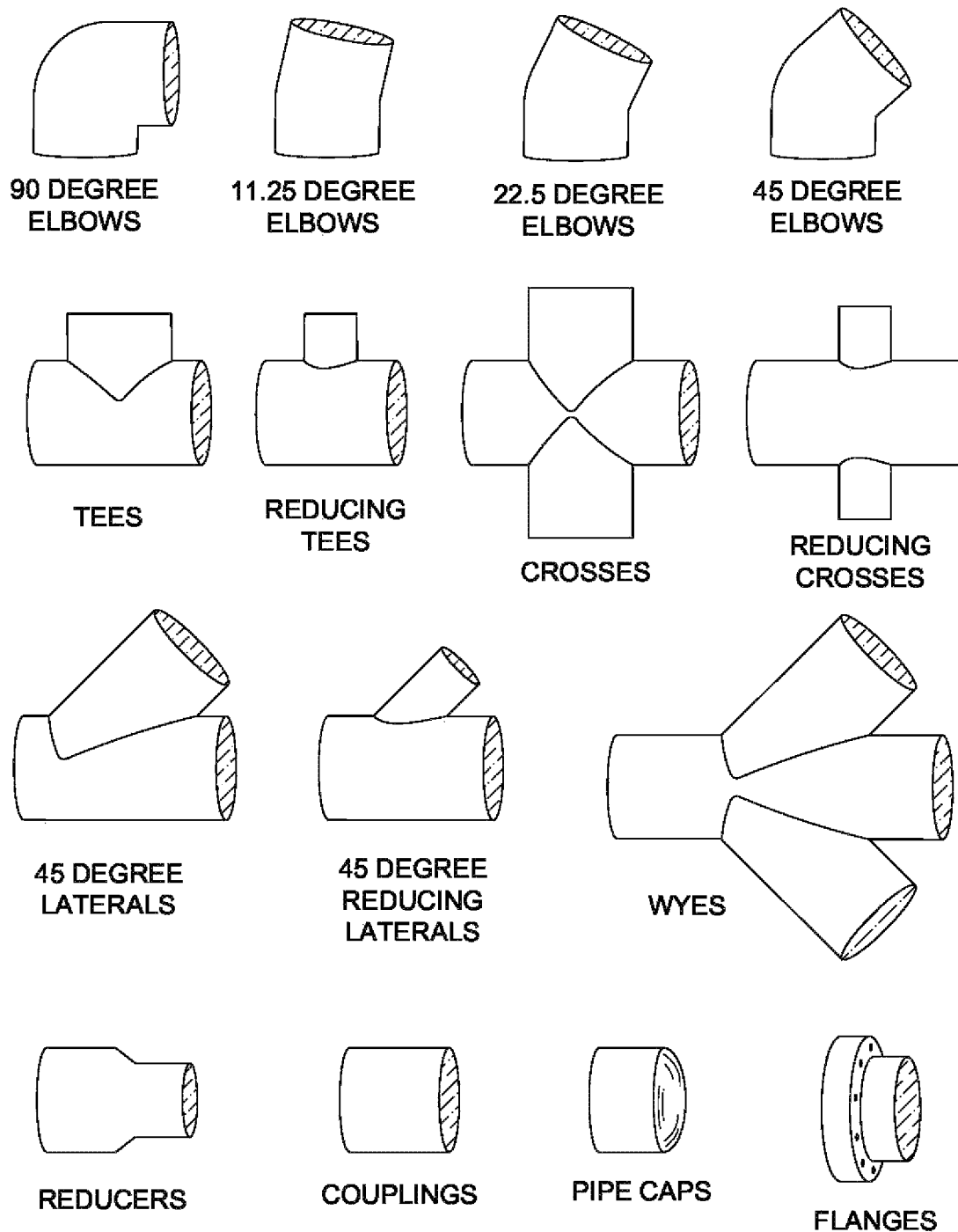
FIGS. 14 and 15 illustrate various end or body portions of the reconfigurable pet toy according to certain aspects of the present disclosure.
Figure 15:
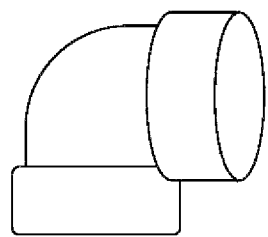
Figure 15:
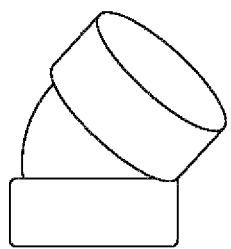
Figure 15:
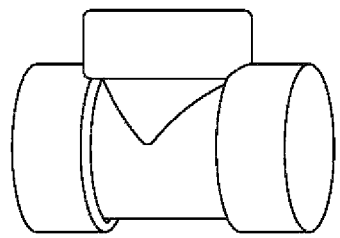
Figure 15:
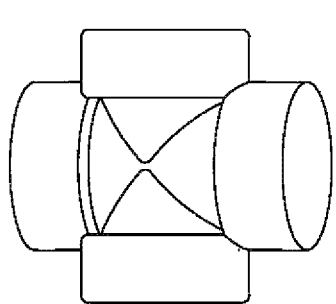
Figure 15:
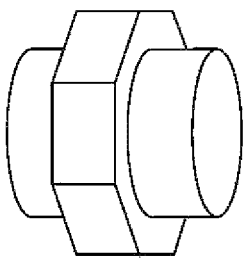
Figure 15:
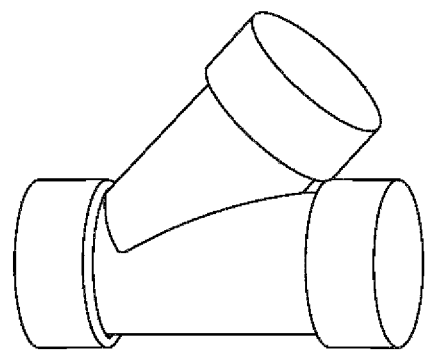
Figure 15:
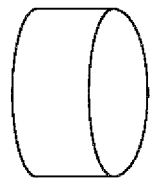
Figure 15:
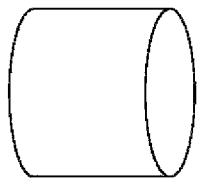

So that the solid food item is not easily displaced from the central channel, one or more attachments or first end portions (e.g., 16 of FIG. 1) may be positioned on the second end 12b of the elongated body portion 12 that may restrict or retard exit of the solid food item. For example, as shown in FIGS. 14 and 15, various connectors or end portions may be positioned at the second end of the body portion, including elbows, tees, crosses, laterals, wyes, reducers, couplers, unions, and combinations thereof. Certain of the connectors or end portions include regions having reduced diameters, such as a reduced tee or reduced laterals, etc. While specific connectors and end portions have been disclosed, others known in the art may be used and are within the scope of the present disclosure.

With continued reference to FIG. 1, an example of a first end portion 16 is shown, which comprises opposing first and second open axial ends (16a and 16b, respectively) and an extension 16C that extends from a side opening 16c of the first end portion 16 at an angle, such as any angle between 5 and 175 degrees relative to the longitudinal axis 11 of the central channel. For example, the extension 16C may extends from the side opening 16c at an angle of 15 to 165 degrees, or 30 to 150 degrees, or 45 to 135 degrees relative to the longitudinal axis 11 of the central channel. The first end 16a of the first end portion 16 may be attached to a second end 12b of the first body portion 12. The extension 16C may be positioned anywhere along the first end portion 16, such as centrally as shown in FIG. 1.

Figure 6:
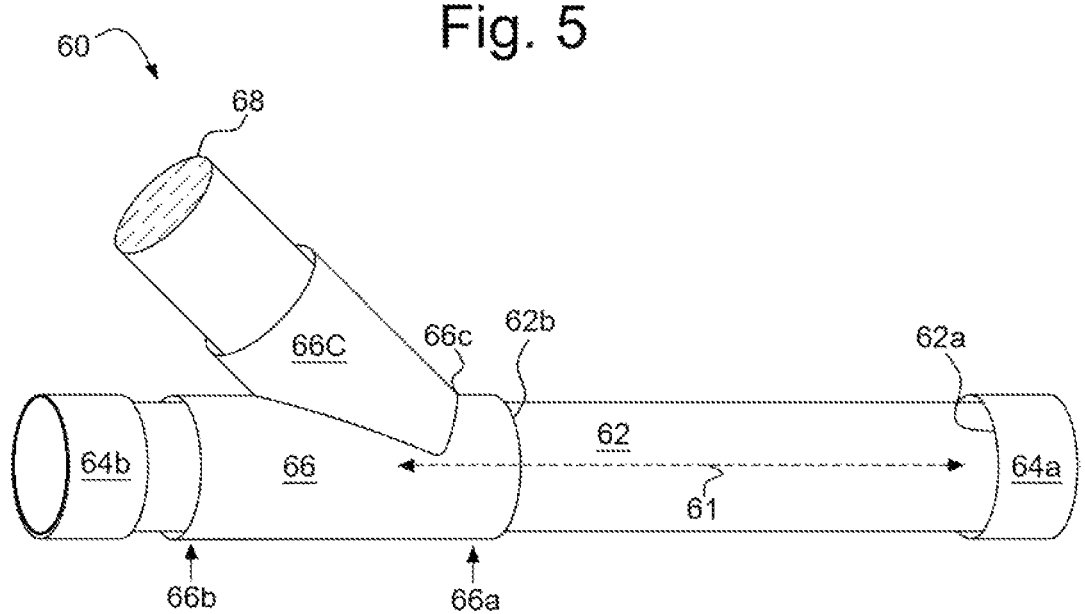

According to certain aspects, the extension portion 16C may extend from the first end portion 16 at an angle of 22.5, 45, 90, 135, or 157.5 degrees relative to the longitudinal axis 11 of the central channel. As shown in FIG. 1, the extension portion 16C extends from the first end portion 16 at an angle of 90 degrees relative to the longitudinal axis 11, i.e., forms a T shape, also referred to herein as a tee. As shown in FIG. 6, the extension portion 66C of the first end portion 66 extends at an angle of 45 degrees relative to the longitudinal axis 61, also referred to herein as a lateral (refer also to FIGS. 14 and 15 for other examples of tees and laterals). Also shown in FIG. 6 is a connector 63 or reduced diameter section that may be included at the exit opening 68 of the first end portion 66.

The first end portion 16 includes an axial bore that is configured to be in communication with the axial bore of the first body portion 12, thus extending the central channel in which the solid food item may be accommodated. As shown in FIG. 1, an opening 18 of the first end portion 16 may provide exit of the solid food item after agitation of the toy 10, such as by a pet during play.

A position of the exit for the solid food item may be changed, such as by positioning a cap on the opening 18 of the first end portion 16 and leaving either of the second end 16b of the first end portion 16 or the first end 12a of the first body portion 12 open, i.e., unsealed. Moreover, according to certain aspects, a cap may be positioned on each of the open axial ends (e.g., 14a, 14b, and a cap that covers opening 18), wherein at least one cap may include at least one hole configured to provide exit for the solid food item. Alternatively, a reduced diameter section may be positioned on one of the open ends (e.g., one of 12a, 16b, 18), while some or all of the other open ends have a cap positioned thereon (e.g., such as cap 14a or 14b).

As shown in FIG. 1, certain of the main body and end portions may have diameters that are smaller than other portions so that ends of the smaller diameter portions may fit within ends of the larger diameter portions. For example, the first end portion 16 is shown to have a larger diameter than the first body portion 12 such that the inner diameter of the first end portion, such as at least the inner diameter at an end 16a of the first end portion 16, allows a tight but releasable fit of an end 12b of the first body portion therein. It should be noted that an opposite size or diameter arrangement is possible and within the scope of the present disclosure. For example, the first body portion 12 may have a larger diameter than the first end portion 16, and the inner diameter of the first body portion, such as at least the inner diameter at an end 12b of the first body portion 12, may allow a tight but releasable fit of an end 16a of the first end portion 16 therein.

Moreover, as shown in FIG. 1, when various portions having the same inner and outer diameters are connected, a coupler may be included. For example, a coupler 13 may comprise an outer diameter configured for a tight but releasable fit within an inner diameter of another section, such as the cap 14b and the first end portion 16, thus providing connection therebetween. Additional examples of couplers are shown throughout the figures such as, for example, in FIG. 9 where sections 92A-92D, 94A, 94B, and 96 are connected via couplers 93a-93g.

Figure 2:
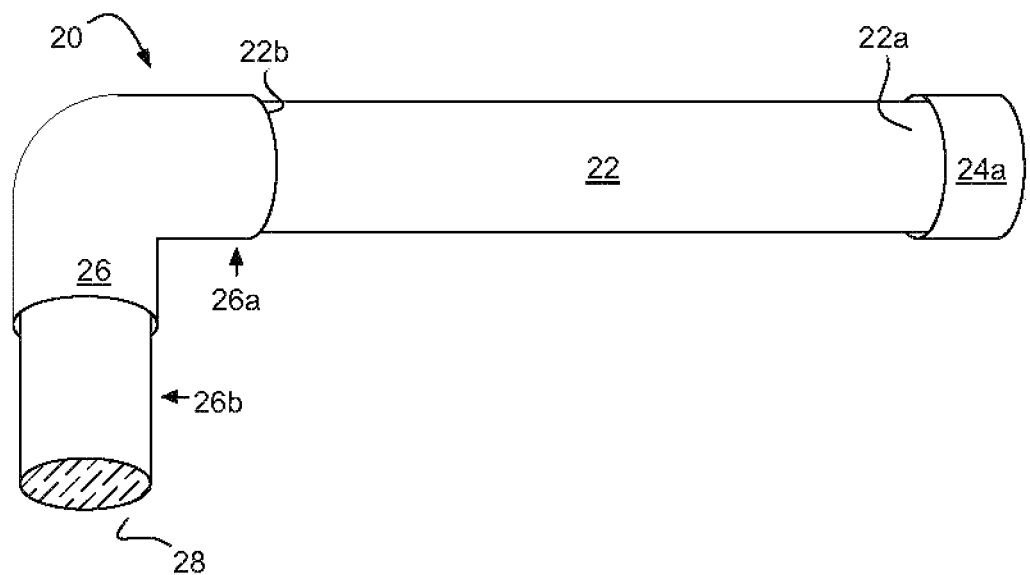
Figure 3:
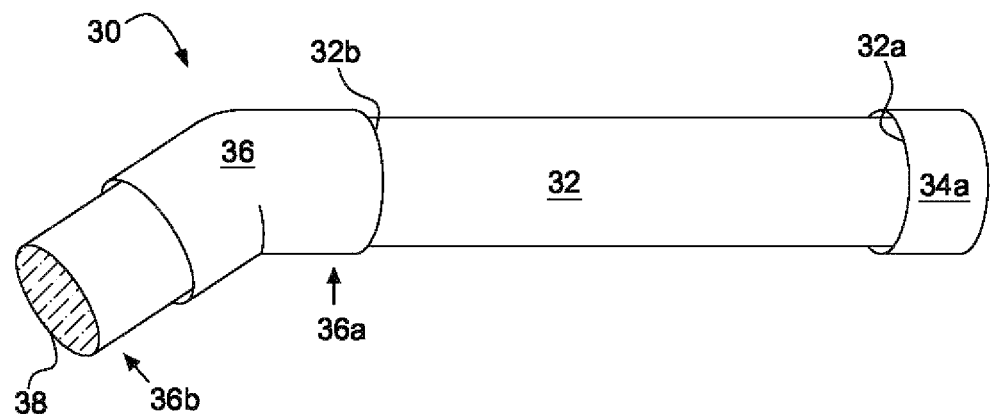
Figure 4:
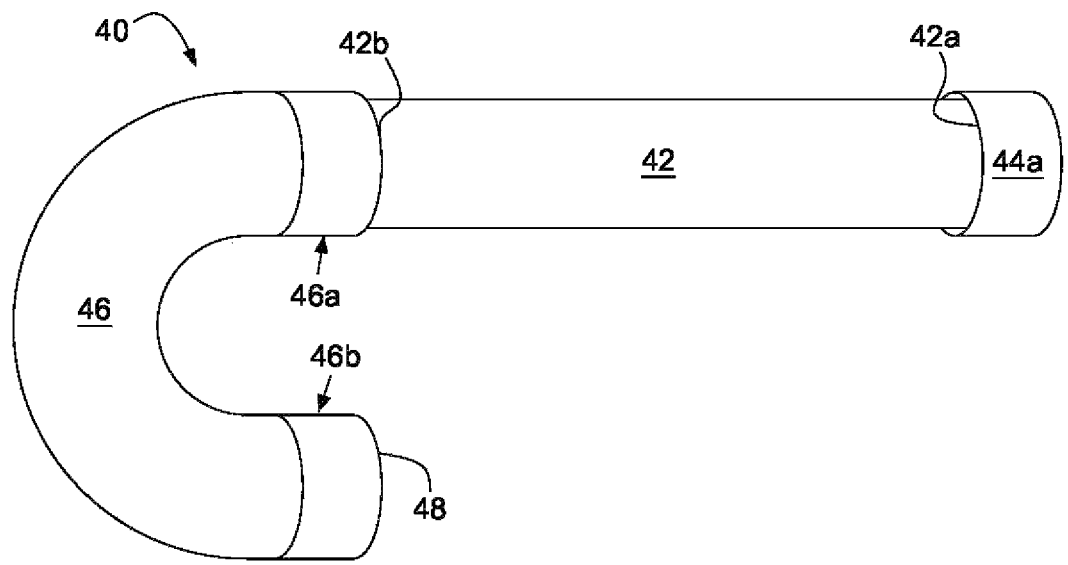

Alternate configurations of the first end portion are shown in FIGS. 2, 3, and 4, wherein each comprise a first end portion (26, 36, 46, respectively) having a different angle. As shown in FIG. 2, the first end portion 26 of the pet toy 20 comprises an elbow having a 90-degree angle that is attached via a first end 26a to the second open end 22b of the first body portion 22. An opening 28 at the second end 26b of the first end portion 26 allows exit of the solid food item. The second end 26b may be at the end of the first end portion 26 or, as shown in FIG. 2, the second end 26b may be at the end of an additional coupler (23) or reduced diameter section.

Alternatively, as shown in FIGS. 3 and 4, the first end portions (36, 46) of the pet toys 30 and 40 may comprise a bend angle of 45 and 180 degrees, respectively. The first end portion (36, 46) may be attached via a first end (36a, 46a) to the second open end (32b, 42b) of the first body portion (32, 42), and includes an opening (38, 48) at the second end (36b, 46b) of the first end portion (36, 46) that allows exit of the solid food item, or as shown in FIG. 3, the second end 36b may be at the end of an additional coupler (33) or reduced diameter section.

Figure 5:
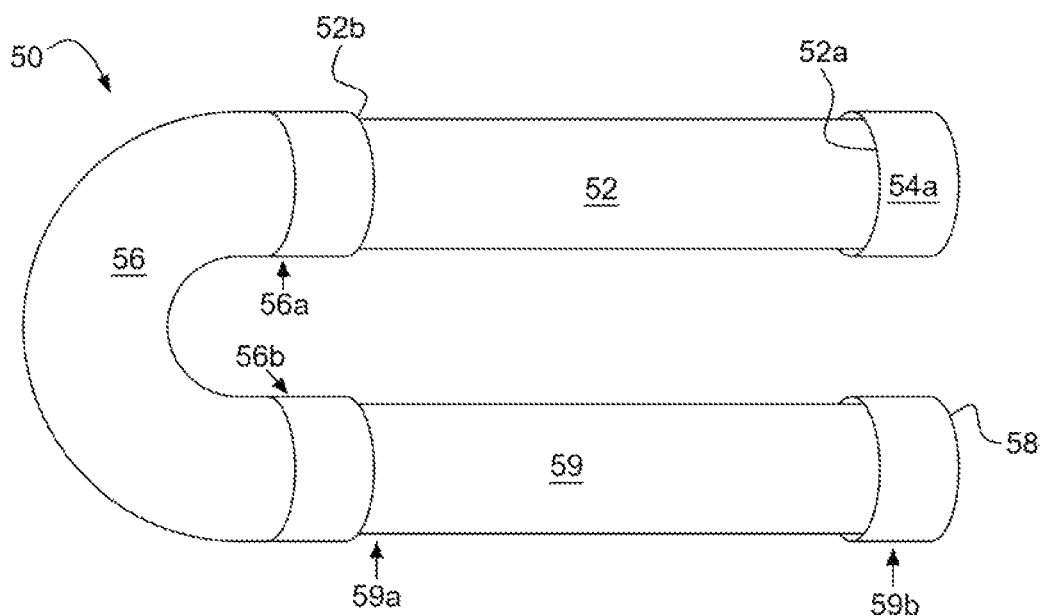

With reference to FIG. 5, the pet toy 50 may comprise additional body portions, such as the additional or second body portion 59, which is shown to be attached to a second end 56b of the first end portion 56. Generally, when referred to as a body portion herein, the element may have an elongated configuration with a central channel, such as a cylinder. Alternatively, when referred to as an end portion herein, the element may have a shape as shown in FIGS. 14 and 15 having an axial bore. When connected, the axial bores of the various body and end portions may extend the continuous channel configured to accommodate a solid food item therein.

With continued reference to FIG. 5, the second end 59b of the second body portion may be open 58 to provide exit for a solid food item contained therein. As mentioned above, additional end portions may be connected to the second end 59b of the second body portion to extend the toy (see for example FIGS. 7 and 8), or to retard exit of the solid food item from the toy (e.g., a reducer shown in FIG. 14 or 15). As shown in FIG. 5, the first end portion 56 may have a bend of 180 degrees so that the first and second body portions (52 and 59, respectively) are positionable parallel to each other. Also shown in FIG. 5 is an additional cap sealed over a second end 59b of the second body portion 59. In such a case, at least one of the caps, i.e., 54a or 54b, may comprise at least one hole configured to provide exit for the solid food item.

Figure 7:
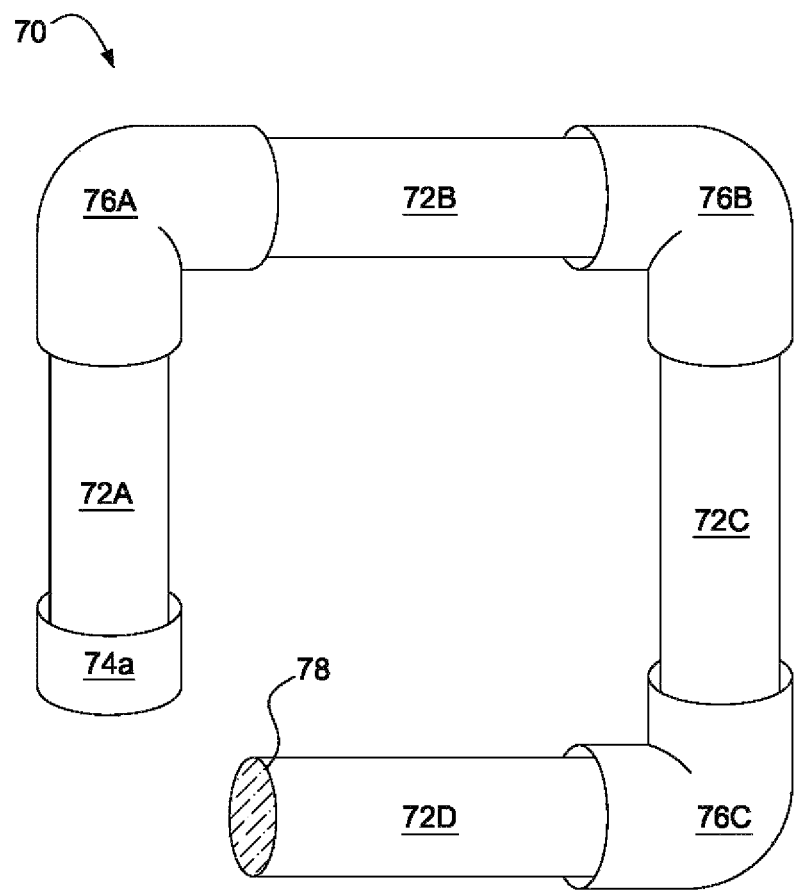
Figure 8:
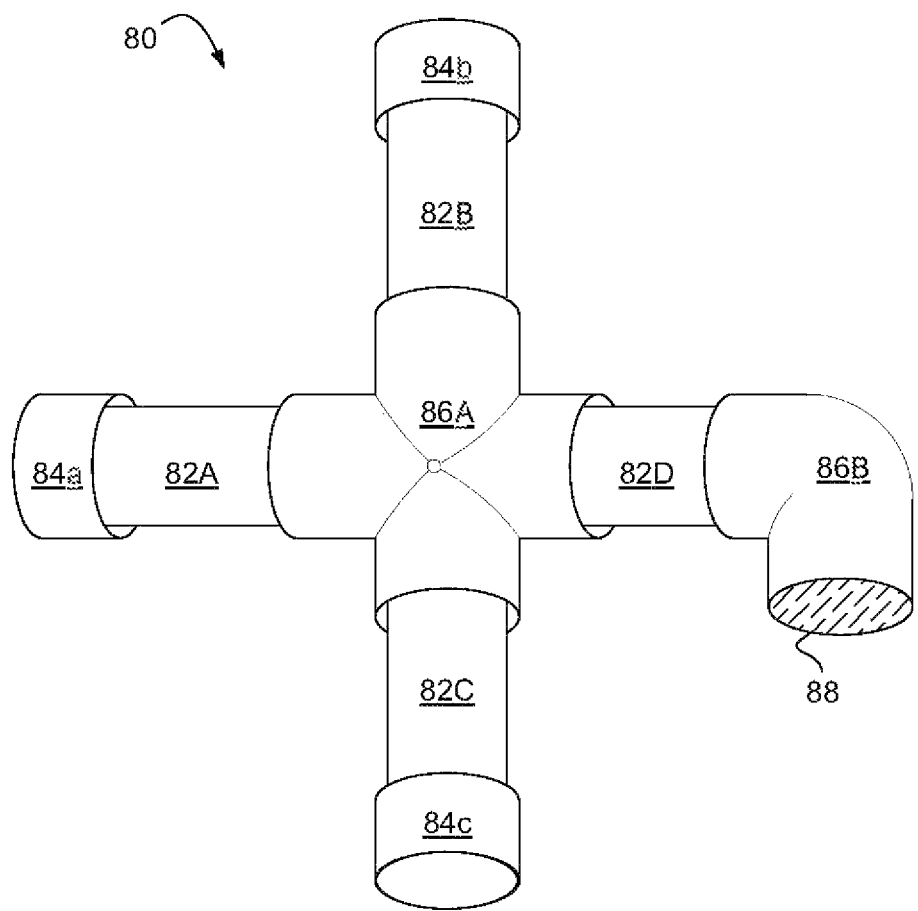

With reference to FIGS. 7 and 8, extended versions of the toy (70 and 80, respectively) are shown. For example, with specific reference to FIG. 7, a first end portion 76A of the toy 70 may comprise a bend of 45 degrees, and a second body portion 72B may be attached to a second end of the first end portion 76A. The toy may further comprise a second end portion 76B attached to a second end of the second body portion 72B, wherein the axial bores of the second body portion and the second end portion extend the continuous channel.

The second end portion 76B may comprise a bend of 45 to 180 degrees and includes an opening 78 at a second end opposite to the attachment of the second body portion 72B that is configured to dispense the solid food item.

According to certain aspects, the toy may be further extended by addition of a third body portion 72C attached to a second end of the second end portion 76B opposite the attachment of the second body portion 72B. This process may be continued, such as by addition of a third end portion 76C attached to a second end of the third body portion 72C opposite the attachment of the second end portion 76B, and even a fourth body portion 72D attached to a second end of the third end portion 76C opposite the attachment of the third body portion 72C.

As shown in FIG. 7, the axial bores of the body portions and the end portions extend the continuous channel, wherein a cap 74a is provided at one end and an opening 78 is provided as the other end so that the solid food item may be contained within the toy 70 until an animal is able to dislodge the food through the opening 78, such as by playing with the toy.

While shown as having a closed end and an open end, the toy could also have been configured to include a fourth end portion that would have connected the first body portion to the fourth body portion, forming a square. In such an arrangement, the cap 74a would be omitted and one or more of the body portions may be substituted with a connector, such as a tee or a lateral that would provide the opening. It should be noted that the exit opening is always positioned on an axial end of a central bore of one or more of the body or end portions, i.e., is not positioned on a side wall of a body or end portion. For clarification, while an end portion such as the first end portion 16 shown in FIG. 1 includes a side opening 16c from which the extension 16C extends, the exit opening 18 is positioned on an axial end of the extension 16C and not on a sidewall thereof.

With specific reference to FIG. 8, a first elongated body portion 82A of the toy 80 may include a cap 84a at a first end and a first end portion 86A at a second end. As shown, the first end portion 86A may be a cross having four connection openings, thus providing connection points for three additional body portions (82A, 82C, 82D), and additional caps (84b, 84c) and/or end portions 86B.

As shown in FIGS. 1-8 and described in the present disclosure, the pet toy may comprise at least one body portion and at least one end portion, each formed of a durable material and having an axial bore therethrough, and at least one cap. The at least one cap may be sealed around a first end of the at least one body portion and the at least one end portion may be attached to a second end of the at least one body portion. The axial bores of each body portion and end portion form a continuous channel configured to accommodate a solid food item, wherein the pet toy comprises at least one opening configured to allow entry and exit of the solid food item. The at least one opening is not positioned radially on the body or end portions but at an end of an axial bore.

Additional exemplary configurations of a pet toy according to the present disclosure are shown in FIGS. 9-13. For example, the toy 90 shown in FIG. 9 includes four elbow connectors having 45-degree angles (components 92A-92D), two elbow connectors having 90-degree angles (components 94A, 94B), and one tee connector (component 96). The various end portions are connected by connectors (93a-93g) having a reduced diameter, such that each of the connector ends fit within ends of the various end portions to form a continuous channel therein having a single open axial end, i.e., opening 98 of the end portion 96.

Figure 10:
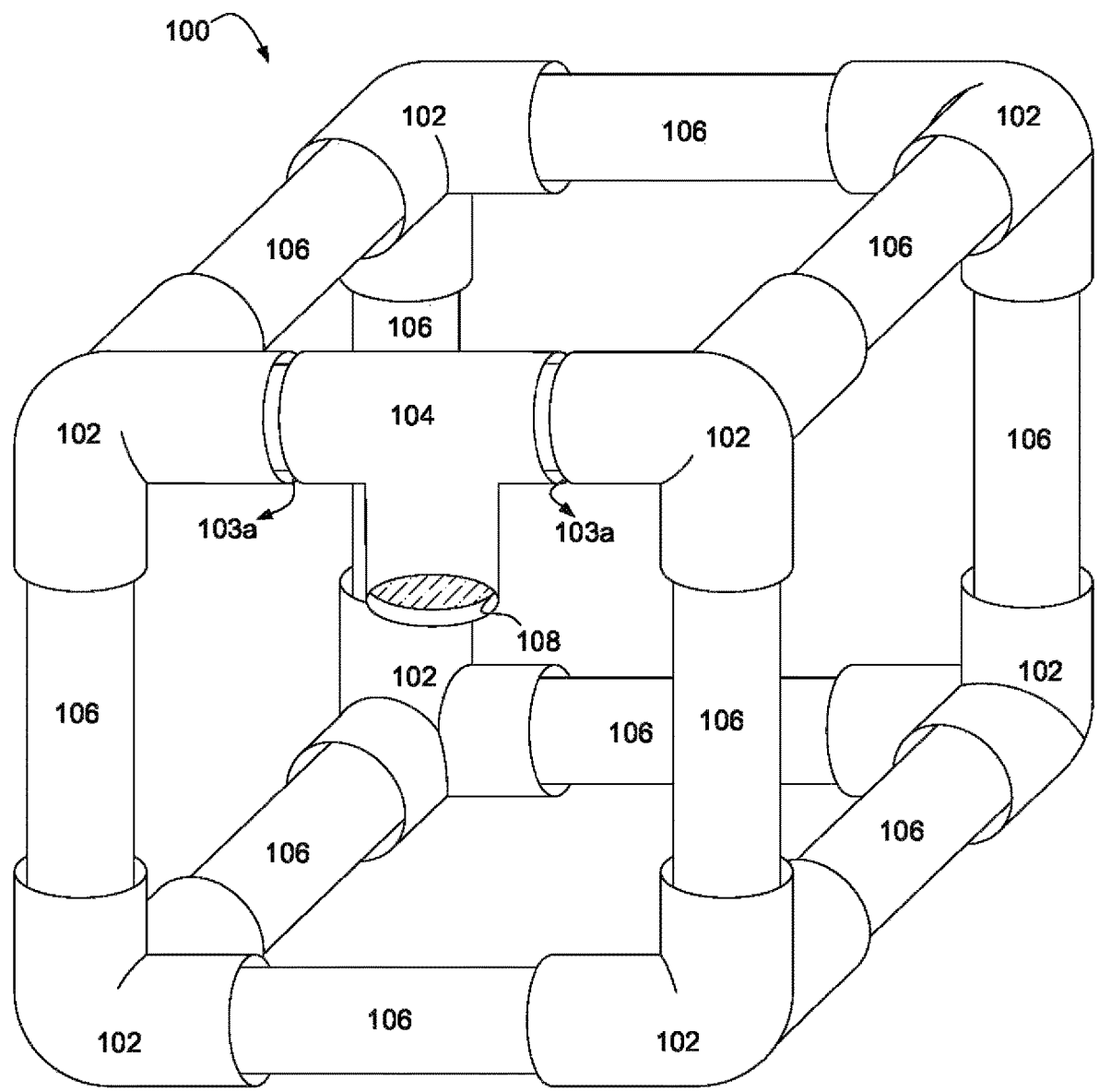

Shown in FIG. 10 is a more complex toy 100 that includes eleven elongated body portions 106 connected by eight corner connectors 102 to form a cube shape. One edge of the cube includes a tee connector 104 attached to the corner connectors via reduced diameter connectors 103a. One of the open axial ends of the tee connector 108 provides exit for the solid food item.

Figure 9:
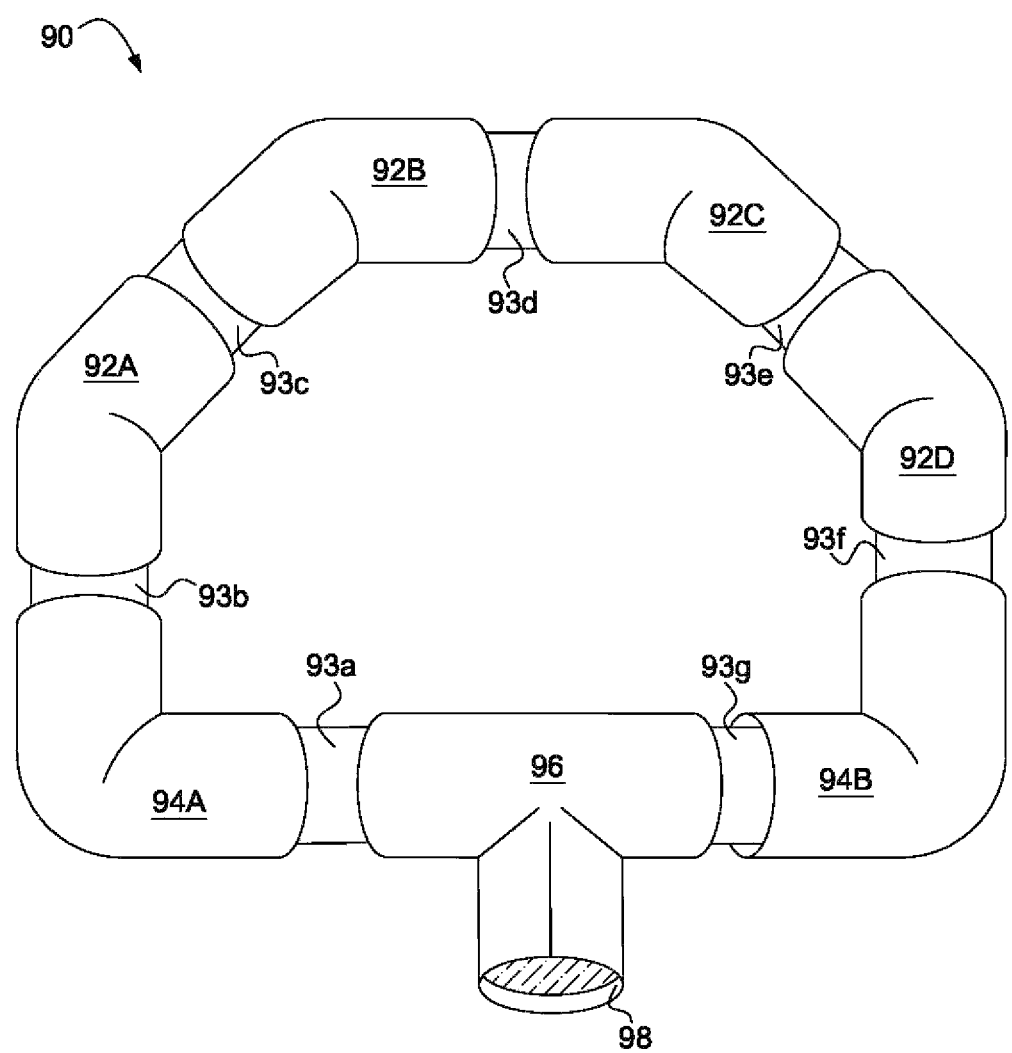

Collectively, the body and end portions and connectors may be referred to herein as components. As illustrated in FIG. 9, the presently disclosed pet toy may not specifically include an elongated body portion, but rather a plurality of end portions. Alternatively, as illustrated in FIG. 10, the presently disclosed pet toy may include a plurality of body portions. Thus, according to certain aspects, the pet toy may comprise a plurality of components formed of a durable material, each individually selected from the group consisting of an elongated body portion, a tee, a reducing tee, an elbow, a wye, a cross, a reducing cross, a corner connector, a union, a coupler, a reducer, a lateral, and a reducing lateral. According to certain aspects, the pet toy may further include at least one cap.

Each component has an axial bore therethrough and at least one open axial end, such as at least two open axial ends, wherein the plurality of components are connectable to each other about their open axial ends to form a continuous channel configured to accommodate a solid food item therein. When included, the at least one cap is configured to seal about the open axial ends of the components.

At least one open axial end of the pet toy provides an opening configured to accept or dispense the solid food item from the animal toy. The opening may remain unsealed, e.g., no cap, or may include a cap sealed thereon, wherein the cap comprises at least one hole configured to accept or dispense the solid food item therethrough. The opening is not positioned radially along the axial bores of the plurality of components but at an axial end thereof.

Figure 11:
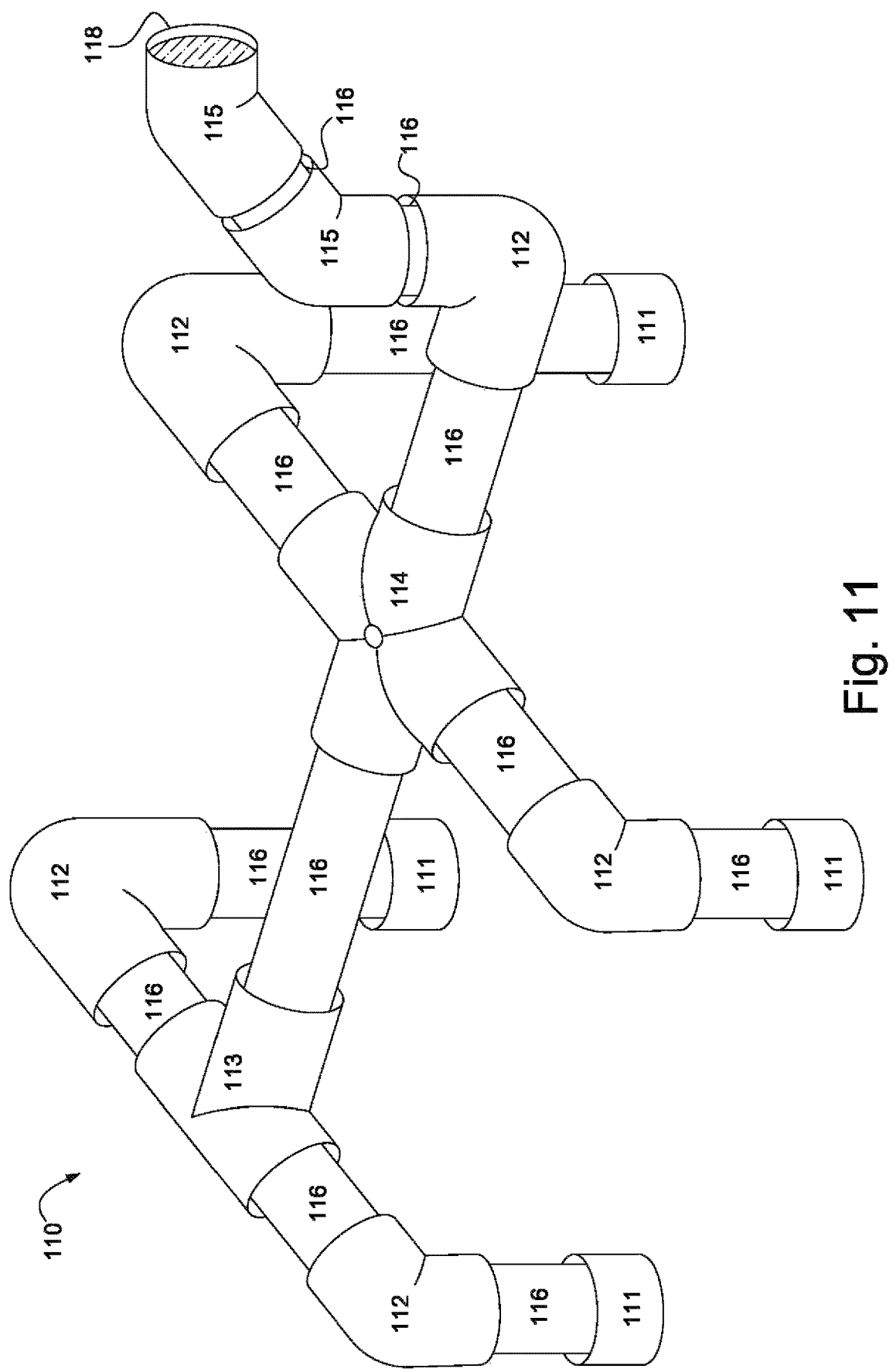

Shown in FIG. 11 is a toy 110 comprising a combination of connectors including elongated body portions 116, elbow connectors (112, 115), tee connectors 113, a cross 114, and caps 111 arranged to provide a complex shape having a single opening 118 that provides exit for the solid food item.

Figure 12:
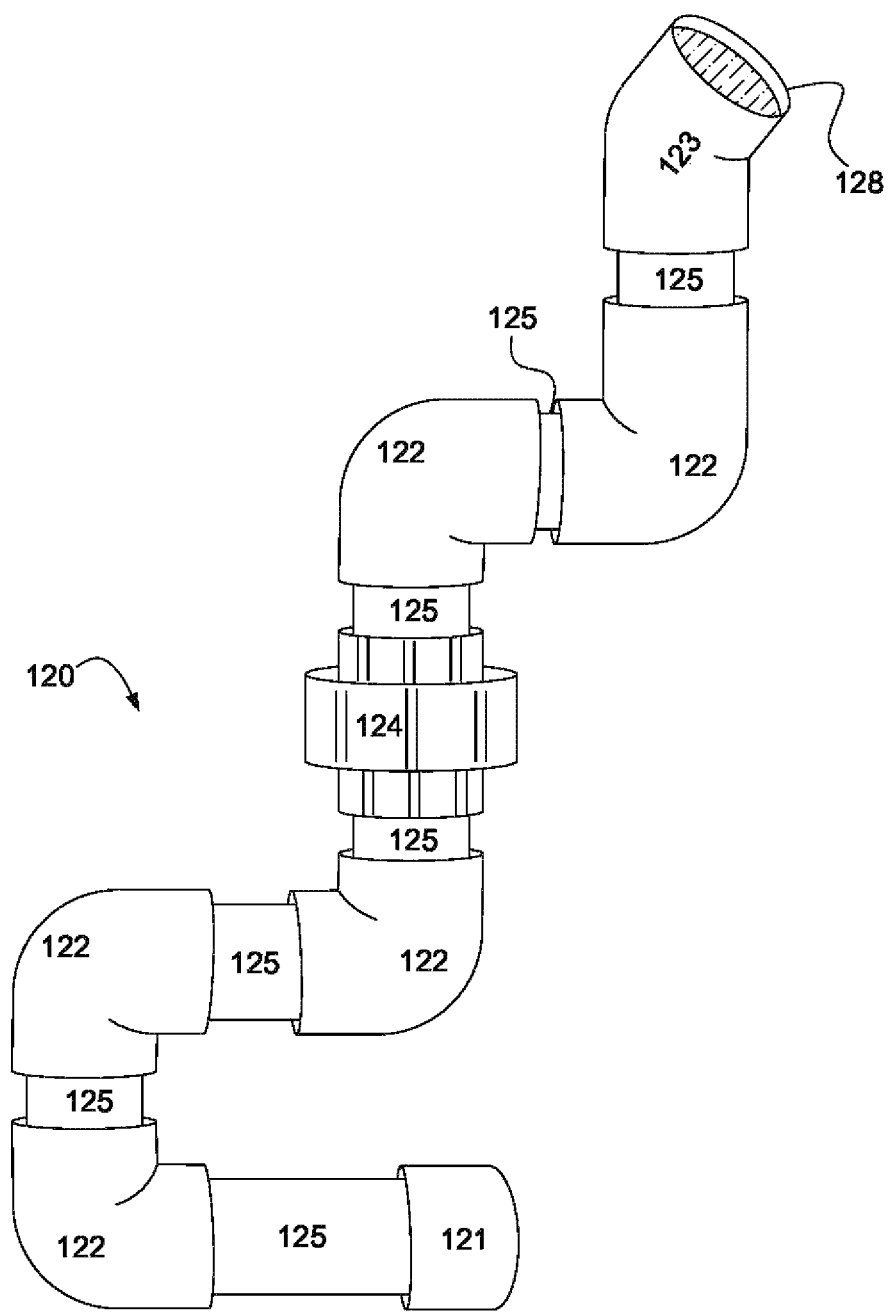

FIG. 12 depicts a toy 120 formed using a combination of connectors including elongated body portions 125, elbow connectors (122, 123), a union 124, and a cap 121 to provide a complex shape having a single opening 128 that provides exit for the solid food item.

Figure 13:
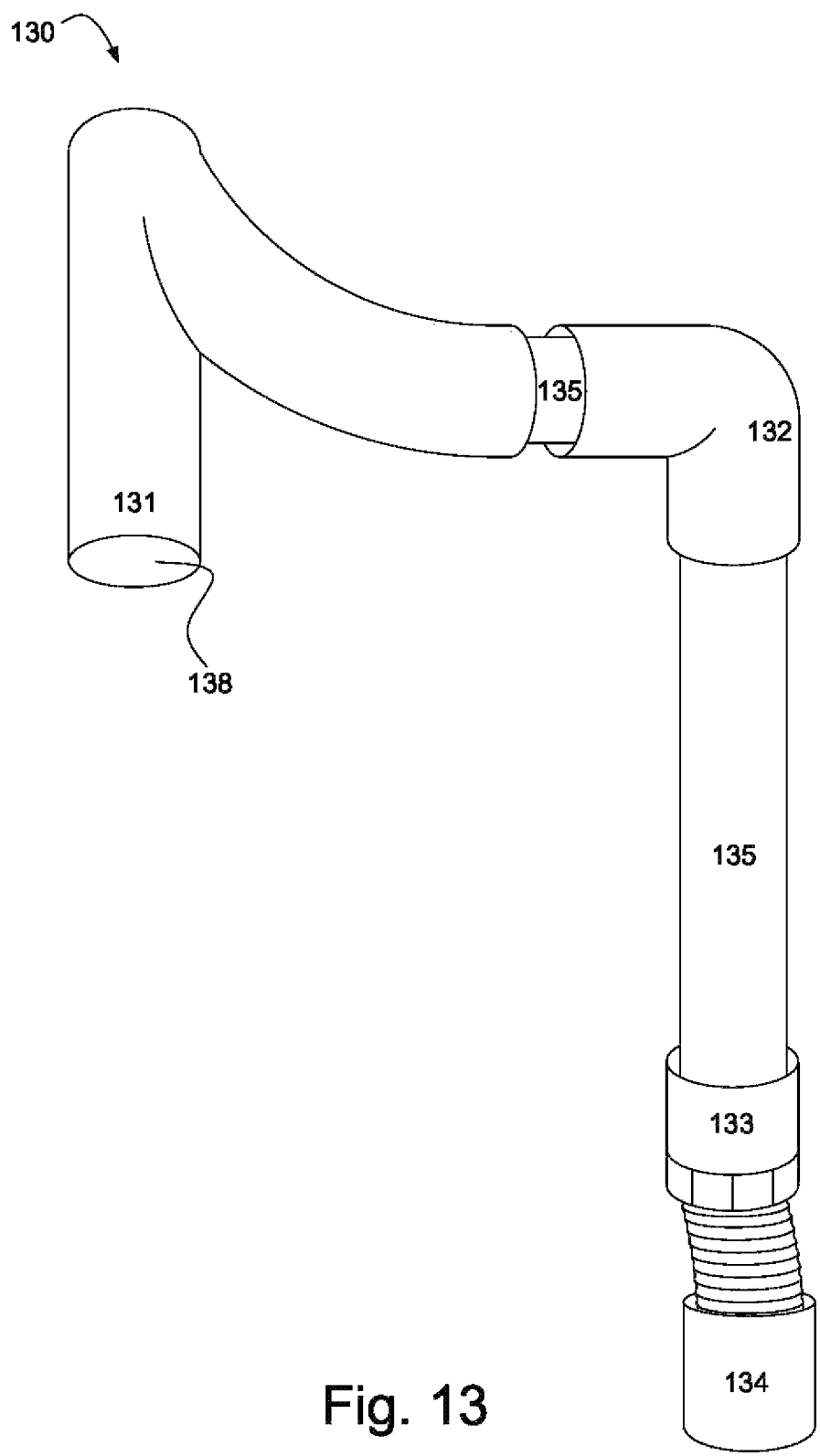

Finally, shown in FIG. 13 is another exemplary pet toy configuration 130 comprising connectors including a body portion 135A and an end portion having an angle greater than 180 degrees 131, an elbow 132, a cap 134, and various connectors (133, 135) that form a complex shape having a single opening 138 that provides exit for the solid food item.

The various components of the animal or pet toys disclosed herein may be designed and configured to be reversibly connectable to one another and may remain attached without the need for sealants. For example, the various components may be configured to be connectable via a press or dry fit, or may be connectable by matching threaded regions (e.g., inner threaded region at ends of the end portions that may be threadedly connectable to outer threads on the main body portion; or vice versa). Alternatively, all or some of the parts may be connected using a glue or sealant. For example, when the components of the toy are formed of PVC, some or all of the parts may be solvent welded, such as with PVC cement and cleaner.

According to certain aspects of the present disclosure, the animal or pet toy may be provided in a specific configuration, such as any of the configurations shown in FIGS. 1-13, and any number of other configurations possible using the body and end portions (i.e., components) disclosed herein. As indicated, the configurations may be reconfigurable, i.e., some or all of the components are reversibly connected such as by a press or dry fit or matching threaded regions. Alternatively, the configurations may be permanently fixed, such as by gluing or sealing the various components together, wherein only caps may be reconfigurable. Still yet, all the components of a configuration, such as including the caps, may be permanently fixed.

The animal or pet toy may be provided as a kit containing a plurality of components including a combination of body and/or end portions, and optionally caps. For example, a kit may include at least two components, such as any combination of elongated body portions and/or end portions, that a user may arrange to form an animal or pet toy.

The various components of the kit may be reversibly connected to one another without glues or sealants, such as by press-fit or a threaded connection, allowing the user to disconnect and reconnect the parts in a different configuration. Additionally, or alternatively, a glue or sealant may be included as part of the kit, allowing the various parts to be securely and generally irreversibly connected.

A kit may comprise at least three components, such as a combination of end and/or body portions, and at least one cap that may be connected to provide an animal or pet toy having a central channel configured to accommodate a solid food item and at least one opening configured to provide exit of the solid food item. In this way, a user of the toy may attach the various portions to provide a first configuration for an animal and may later reconfigure the various portions to provide a second or third, etc. configuration for the animal. As such, the user may change a location of the exit opening for the solid food item, and/or may extend the size or shape of the toy, such as to provide a toy that more than one pet can interact with at one time, thus increasing the animals long term interest in the toy.

While listed embodiments of the pet or animal toys disclosed herein generally comprise at least two components and a cap, the present disclosure is envisioned to further encompass a single component pet or animal toy having a central channel configured to accommodate a solid food item and at least one opening configured to provide entry/exit of the solid food item. The at least one opening is not positioned radially along any axial bore of the single component toy but at an axial end thereof.

For example, a single component pet or animal toy could comprise any of the configurations shown herein, or any configuration possible with the various components disclosed herein, that is formed from a single component, such as by additive manufacturing (e.g., 3D printing), molding (e.g., extrusion, injection, blow molding), or thermoforming methods. The single component pet or animal toy may include one or more caps that cover axial end(s) and are integral (i.e., formed as part of the single component) or separate. The one or more separate caps may be releasably attachable along an axial end so that the opening(s) configured to provide exit of the solid food item may be reconfigured. Alternatively, the one or more separate caps may be glued into a specific configuration by the user or upon manufacture of the toy.

The various portions of the toy(s) disclosed herein may be formed of a durable material, such as a material capable of withstanding the bite strength of a dog, without easily disintegrating, tearing, or puncturing. That is, the material may have a yield strength configured to withstand an animal bite strength of at least 200 psi, such as at least 300 psi, or at least 400 psi, or at least 500 psi, or at least 600 psi, or at least 700 psi, or up to 800 psi. For example, the material may be a polymer having a shore D hardness of at least 60 or a Rockwell hardness of at least 50, or even a polymer having a shore D hardness of at least 70 or a Rockwell hardness of at least 60. The material may be a polymeric material that is certified as food-grade or otherwise safe for use in contact with a food product. The material may be a polymeric material that is certified as safe for use in products for human and/or animal contact.

Exemplary materials include at least polyvinyl chloride (PVC), high density polyethylene (HDPE), polypropylene (PP), polyethylene terephthalate (PETE), polylactic acid (PLA) polymers, or a combination thereof. For example, an exemplary PLA polymer includes the temperature resistant, bio polymer from BigRep America Inc. (Wilmington, Mass.), having a shore D hardness of 75. Exemplary PVC materials include schedule 40 and schedule 80 PVC. While each of these materials are generally safe for human and animal use, it should be noted that animals should always be monitored while at play with any of the toys disclosed herein, as is common and industry standard for certain pet products on the market (e.g., Nylabone®).

Exemplary materials may further include rubbery materials such as styrene-butadiene-styrene, styrene-butadiene copolymer, polychloroprene (neoprene), nitrile rubber, butyl rubber, polysulfide rubber ("Thiokol"), cis-i,4-polyisoprene, ethylene-propylene terpolymers (EPDM rubber), silicone rubber, polyurethane rubber, and vulcanized natural rubber. Other materials that are elastomeric and puncture-resistant may also be used.

For all of the various embodiments disclosed herein, each of the components may comprise a variety of colors or may even glow-in-the-dark so that the parts or the entire toy may be located easily. Moreover, certain or all of the components may be clear so that the animal can see the solid food item contained therein, i.e., treats.

For all of the various embodiments disclosed herein, selection of the material of the toy may depend on the animal for which the toy is designed. For example, toys designed for different sized dogs may be provided in different sizes and with different durability characteristics (e.g., hardness). When compared to a smaller dog, a larger dog such as a mastiff may enjoy a larger toy formed of a more durable polymeric material to accommodate their large mouths and more powerful bite strength (e.g., over 700 psi). A smaller dog, such as a sheltie, may enjoy a smaller toy and may not require the same material durability (i.e., thickness) as they have much weaker bite strength (e.g., less than 200 psi). Thus, the toy may be formed of a high tensile and/or yield strength material for certain large dog breeds and lower tensile and/or yield strength material for smaller dog breeds. This may be accomplished by selection of different materials and/or different thicknesses and sizes of the materials.

As a specific example, when the toy is intended for use by a small dog, the material may comprise schedule 40 PVC, and the various components of the toy may be sized accordingly (e.g., 0.5-1.5 inch outer diameter with a wall thickness of 0.05 to 0.16 inches). However, when the toy is intended for use by a large dog, the material may comprise schedule 80 PVC, and the various components would be larger in size according to the increases size of the dog (e.g., 0.75 to 2.5 inch outer diameter with a wall thickness of 0.1 to 0.25 inches). Other sizes and thicknesses (i.e., inner and outer diameters and wall thicknesses) of the polymeric materials may be selected, generally based on the size of the animal for which the toy is intended.

The solid food items that may be used in the disclosed animal or pet toys are preferably solid treats, such as dog biscuits, but pasty treats, such as dog food, may also be used. While a pet owner may insert treats into the animal or pet toy, the toy may also be sold with treats already contained within the modules. Moreover, while disclosed as a food item, other solid items may be included in the central channel of the disclosed animal or pet toy, such as cat nip or cat mint.

While specific embodiments of the pet toy have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the present disclosure.

What is claimed is:

1. An animal toy comprising:
    a plurality of components formed of a durable material, each component having an axial bore therethrough and at least two open axial ends, wherein the plurality of components are connectable to each other about their open axial ends to form a continuous and unobstructed interior channel to accommodate a solid food item therein;
    at least one cap sealed about and closing one of the open axial ends; and
    an end cap comprising at least one opening therein sealed about and closing another of the open axial ends, wherein the at least one opening accepts or dispenses the solid food item therethrough,
    wherein the animal toy does not comprise radial openings positioned on a sidewall of any of the plurality of components that would allow exit of the solid food item.

2. The animal toy of claim 1, comprising at least two components individually selected from the group consisting of an elongated body portion, a tee, a reducing tee, an elbow, a wye, a cross, a reducing cross, a corner connector, a union, a coupler, a reducer, a lateral, and a reducing lateral.

3. The animal toy of claim 1, wherein the durable material comprises polyvinyl chloride (PVC), high density polyethylene (HDPE), polypropylene (PP), polyethylene terephthalate (PET), polylactic acid (PLA) polymer, or a combination thereof having a shore D hardness of at least 60 or a Rockwell hardness of at least 50.

4. An animal toy comprising:
    a first elongated body portion formed of a durable material and having an axial bore therethrough;
    a cap sealed around and closing a first end of the first elongated body portion;
    a first end portion attached to a second end of the first elongated body portion, the first end portion formed of a durable material and having an axial bore therethrough; and
    an end cap comprising at least one opening therein sealed about and closing an open axial end of the first end portion, wherein the at least one opening accepts or dispenses the solid food item therethrough,
    wherein the axial bores of the first elongated body portion and the first end portion form a continuous and unobstructed interior channel to accommodate a solid food item, and
    wherein the animal toy does not comprise radial openings positioned on a sidewall of the first elongated body portion or the first end portion that would allow exit of the solid food item.

5. The animal toy of claim 4, wherein the first end portion is selected from the group consisting of a tee, a reducing tee, an elbow, a wye, a cross, a reducing cross, a corner connector, a union, a coupler, a reducer, a lateral, and a reducing lateral.

6. The animal toy of claim 4, wherein the durable material comprises polyvinyl chloride (PVC), high density polyethylene (HDPE), polypropylene (PP), polyethylene terephthalate (PET), polylactic acid (PLA) polymer, or a combination thereof having a shore D hardness of at least 60 or a Rockwell hardness of at least 50.

7. The animal toy of claim 4, wherein the first end portion comprises:
    a second end; and
    at least one extension portion that extends from the first end portion at an angle of 15 to 165 degrees relative to a longitudinal axis of the first body portion, wherein the at least one extension portion comprises an axial bore in communication with the continuous channel and an open end,
    wherein either of the second end or the open end of the at least one extension portion comprises a second cap sealed thereon, and the other of the second end or the open end of the at least one extension portion not having the second cap sealed thereon comprises the at least one opening configured to dispense the solid food item therefrom, and
    wherein the at least one extension portion does not comprise radial openings positioned on a sidewall that would allow exit of the solid food item.

8. The animal toy of claim 6, wherein the axial bore of the at least one extension portion has a smaller diameter than a diameter of the axial bores of the first end portion and the first body portion.

9. The animal toy of claim 7, further comprising:
    a second body portion formed of a durable material and having an axial bore, the second body portion attached to the second end of the first end portion or the open end of the at least one extension portion thereof so that the axial bore extends the continuous channel,
    wherein the second body portion does not comprise radial openings positioned on a sidewall that would allow exit of the solid food item.

10. The animal toy of claim 4, further comprising:
    a second body portion formed of a durable material and having an axial bore, the second body portion attached to the second end of the first end portion so that the axial bore extends the continuous channel; and
    a second end portion formed of a durable material and having an axial bore, wherein the second end portion is attached to a second end of the second body portion opposite the attachment of the first end portion, or to an extension portion that extends from the first end portion,
    wherein the axial bores of the second body portion and the second end portion extend the continuous channel, wherein the second body portion and the second end portion do not comprise radial openings positioned on a sidewall that would allow exit of the solid food item.

11. The animal toy of claim 10, further comprising:
a third body portion formed of a durable material and having an axial bore, wherein a first end of the third body portion is attached to a second end of the second end portion opposite the attachment of the second body portion or to an extension portion that extends from the first or second end portion;
a third end portion formed of a durable material and having an axial bore, the third end portion attached to a second end of the first, second, or third body portion or to an extension portion that extends from the first or second end portion,
wherein the axial bores of the third body portion and the third end portion extend the continuous channel,
wherein the third body portion and the third end portion do not comprise radial openings positioned on a sidewall that would allow exit of the solid food item.

12. A kit providing a reconfigurable animal toy, the kit comprising:
at least one elongated body portion formed of a durable material and having an axial bore therethrough and at least two open axial ends;
a plurality of end portions each formed of a durable material and having an axial bore therethrough and at least two open axial ends, wherein the plurality of end portions comprises at least a tee and a coupler;
at least two caps releasably sealed about and closing the open axial ends; and
an end cap comprising at least one opening therein releasably sealed about and closing an open axial end of the first end portion, wherein the at least one opening accepts or dispenses the solid food item therethrough,
wherein the at least one elongated body portion, the plurality of end portions, the at least two caps, and the end cap are connectable to form a reconfigurable animal toy having a central unobstructed interior channel to accommodate a solid food item therein,
wherein the at least one opening is not positioned radially along the axial bores of the at least one elongated body portion or the plurality of end portions but at an axial end thereof, and
wherein the at least one elongated body portion and the plurality of end portions do not comprise radial openings positioned on a sidewall that would allow exit of the solid food item.

13. The kit of claim 12, wherein the plurality of end portions further comprises one or more end portions individually selected from the group consisting of a tee, a reducing tee, an elbow, a wye, a cross, a reducing cross, a corner connector, a union, a coupler, a reducer, a lateral, and a reducing lateral.

14. The kit of claim 12, comprising:
at least two elongated body portions; and
at least three end portions.

15. The kit of claim 12, wherein the durable material comprises a polymer having a shore D hardness of at least 60 or a Rockwell hardness of at least 50.

16. The kit of claim 15, wherein the durable material comprises a polymer having a shore D hardness of at least 70 or a Rockwell hardness of at least 60.

17. The kit of claim 12, wherein the durable material comprises polyvinyl chloride (PVC), high density polyethylene (HDPE), polypropylene (PP), polyethylene terephthalate (PET), polylactic acid (PLA) polymer, or a combination thereof.

18. The animal toy of claim 4, wherein at least the first elongated body portion comprises an outer diameter of 0.5-1.5 inches and a wall thickness of 0.05 to 0.16 inches.

19. The animal toy of claim 4, wherein at least the first elongated body portion comprises an outer diameter of 0.75 to 2.5 inches and a wall thickness of 0.1 to 0.25 inches.

* * * * *